United States Patent [19]

Tomohisa et al.

[11] Patent Number: 4,691,241

[45] Date of Patent: Sep. 1, 1987

[54] METHOD AND SYSTEM FOR COMPENSATING FOR A SHADING PHENOMENON

[75] Inventors: Kunio Tomohisa, Kyoto; Kiyoshi Maeda, Osaka; Masamichi Cho, Kyoto, all of Japan

[73] Assignee: Dainippon Screen Mfg. Co., Ltd., Kyoto, Japan

[21] Appl. No.: 671,984

[22] Filed: Nov. 15, 1984

[30] Foreign Application Priority Data

Dec. 6, 1983 [JP] Japan .................................. 58-231084
Dec. 6, 1983 [JP] Japan .................................. 58-231083

[51] Int. Cl.⁴ .............................................. H04N 1/10
[52] U.S. Cl. .................................... 358/293; 358/264; 358/265; 358/266; 358/285; 329/144; 331/DIG. 2
[58] Field of Search ............... 358/163, 206, 208, 285, 358/293, 256, 264, 265, 266, 267; 346/108; 329/122; 331/DIG. 2; 329/144; 250/578, 237

[56] References Cited

U.S. PATENT DOCUMENTS

| | | | |
|---|---|---|---|
| 3,835,249 | 9/1974 | Dattilo et al. | 358/264 |
| 3,984,629 | 10/1976 | Gorog | 358/285 |
| 4,000,368 | 12/1976 | Tisue | 358/264 |
| 4,518,998 | 5/1985 | Warner | 358/206 |

FOREIGN PATENT DOCUMENTS 2557863  6/1976  Fed. Rep. of Germany .

Primary Examiner—Edward L. Coles, Sr.
Attorney, Agent, or Firm—Lowe, Price, LeBlanc, Becker & Shur

[57] ABSTRACT

An image signal of the input and/or the output side is (are) multiplied by a shading compensation signal obtained from the output signal of a low-pass filter employed in a PLL circuit or a greating signal multiplying means.

12 Claims, 15 Drawing Figures

(a)

fin (b)

$V_{LPF}$ (c)

f out

METHOD AND SYSTEM FOR COMPENSATING FOR A SHADING PHENOMENON

FIELD OF THE INVENTION

This invention relates to a compensation for a shading phenomenon which is caused in reproducing images by using a laser beam scanner fatally having a nonlinear characteristic of its scanning speed on an original.

BACKGROUND OF THE INVENTION

An optical system of a laser beam scanner for scanning an original is as shown in FIG. 1. In FIG. 1, a beam emitted from a laser beam producer $11_a$ diverges into a grating beam $B_G$ and a scanning beam $B_P$ by means of an optical instrument such as a half mirror. The scanning beam $B_P$ is expanded by a beam expander $12_P$ to have a fixed diameter, and is brought to a galvano mirror 13 to be polarized. After passing through an object lens 14, the scanning beam $B_P$ is reflected at a mirror 15 to scan an original A in the direction indicated by an arrow in FIG. 1. Then each element of a photo-sensor array 16 receives a reflected beam from the original A to convert it into a corresponding voltage signal.

In the meantime, said grating beam $B_G$ is expanded to have a fixed diameter by a beam expander $12_G$ and is brought to the galvano mirror 13 to be polarized. After passing through the object lens 14, the grating beam $B_G$ is brought to an optical grating 17. Then the grating beam $B_G$ is picked up by each element of a photo-sensor array 18 to produce a grating signal $f_{in}$.

In the above described optical system, the galvano mirror 13 is driven by a signal V (Voltage) expressed by an equation:

$$V = V_O \sin \omega t \tag{1}$$

wherein $V_O$ is the maximum amplitude of the signal V, while $\omega$ is an angular velocity. Therefore, the swing angle $\theta$ (radian) of the galvano mirror 13 is expressed by an equation:

$$\theta = \theta_O \sin \omega t \tag{2}$$

wherein $\theta_O$ is the maximum swing angle of the galvano mirror.

FIG. 2 shows the detail of the action of the scanning beam $B_P$ which is scanning an original A and is polarized by the galvano mirror 13, from which the mirror 15 is omitted for simplification.

In FIG. 2, the scanning length L (mm) of the scanning beam $B_P$ can be expressed by an equation:

$$L = 2 \cdot y = 2 \cdot f \cdot \tan 2\theta \tag{3}$$
$$= 2 \cdot f \cdot \tan (2 \cdot \theta_0 \cdot \sin \omega t)$$

wherein f (mm) is the focal distance of the object lens 14.

On the other hand, the scanning speed V of the scanning beam $B_P$ can be expressed by an equation:

$$V = \frac{aL}{at} = K_1 \cdot \frac{\cos \omega t}{\cos^2 (2 \cdot \theta_0 \cdot \sin \omega t)} \tag{4}$$

wherein $K_1$ is $K_1 = 4 \cdot f \cdot \theta_O \cdot \omega$.

It is noted that, assuming that the projection area (diameter) of the scanning beam $B_P$ on the original A is canstant regardless of the swing angle $\theta$ of the galvano mirror 13, the time T that the spot of the scanning beam $B_P$ on the original A moves per a unit length l can be expressed by an equation:

$$T = \frac{l}{V} = \frac{l}{K_1} \cdot \frac{\cos^2 (2 \cdot \theta_0 \cdot \sin \omega t)}{\cos \omega t} \tag{5}$$

therefore, the integrated beam quantity E (per a unit time and a unit length) can be expressed by an equation:

$$E = P \cdot T = P \cdot K_2 \cdot \frac{\cos^2 (2 \cdot \theta_0 \cdot \sin \omega t)}{\cos \omega t} \tag{6}$$

wherein P is the intensity (W) of the scanning beam $B_P$ and $K_2$ is $K_2 = l/k_1$.

FIG. 3 shows a graph of the variation of the integrated beam quantity E of one scanning line obtained by specifying the parameters of the right member of the equation (6). When an image signal is obtained by using the scanning beam $B_P$ having such a characteristic, the voltage of the signal corresponding to the central portion of the scanning line becomes lower and that of the image signal corresponding to the edge portion thereof becomes higher. Therefore, a compensation process for such a shading phenomenon is carried out in conventional laser beam scanners. To resolve the above-mentioned problem, Japanese Patent laid Open No. 58-27466 discloses the following method. That is, by previously inputting proper shading compensation coefficients for specific points of one scanning line to a memory, an image signal from a photo-sensor is compensated for the shading phenomenon. Inconveniently, this method naturally requires a certain amount of memory capacity, furthermore, since the coefficients for the points other than the specific points are computed through an interpolation process in the method, any system for embodying the method must be provided with computation device and a software for the above computation process. What is more inconvenient of such a computer is its inability of processing image data in real time.

Japanese Patent Publication No. 58-19187 discloses another method as follows. That is, the inverse values of shading compensation coefficients are input to a memory beforehand instead of the coefficients themselves, and an image signal is compensated for the shading phenomenon by means of a multiplication between the coefficient and the image signal. Practically, the inverse coefficients are reduced by a certain value in being input to the memory to allow the memory capacity to be smaller, however, the method has the same drawback that the previous method has.

Japanese Patent laid Open No. 57-119565 discloses yet another method as follows. That is, as well as the above-mentioned two methods, the compensation process is carried out by using coefficients stored in a memory beforehand, in addition, this method adopts a troublesome way of determining the coefficients by previously scanning a reference (white) original.

SUMMARY OF THE INVENTION

This invention is proposed to resolve the above conventional drawbacks.

An object of this invention is to provide a method and system for compensating for a shading phenomenon using no expensive memory for storing shading compensation coefficients. Another object of this invention is to provide the above method free from a requirement of software for computing shading compensation coefficients.

To achieve the above objects, this invention carries out the following processes on an input and/or an output signal(s).

In the input side, an image signal, i.e, a voltage signal being in inverse proportion to the scanning speed of a scanning beam polarized by a beam polarizing means is multiplied by a compensation signal (mentioned afterwards), i.e., a voltage signal being proportional to the scanning speed of the input scanning beam to obtain a compensated image signal. The above-mentioned compensation signal can be obtained by adjusting the offset value and the amplitude of the output signal of a low-pass filter of a PLL circuit with a signal obtained from an optical grating is multiplied by the PLL circuit.

In the output side, an image signal, i.e., a voltage signal is multiplied by a compensation signal, i.e., a voltage signal being in proportion to the scanning speed of a recording beam polarized by a polarizing means to obtain a recording signal, and then the recording signal is used for driving the recording beam in exposing a photosensitive material. This recording compensation signal can be obtained in the same manner as mentioned on the input side.

By using the above-mentioned method and system, a real-time shading compensation process can be performed by using a circuit which is simpler than that used in any other conventional systems.

The above and other objects and features of this invention can be appreciated more fully from the following detailed description when read with reference to the accompanying drawings.

PREFERRED EMBODIMENT OF THIS INVENTION

Figure 4:
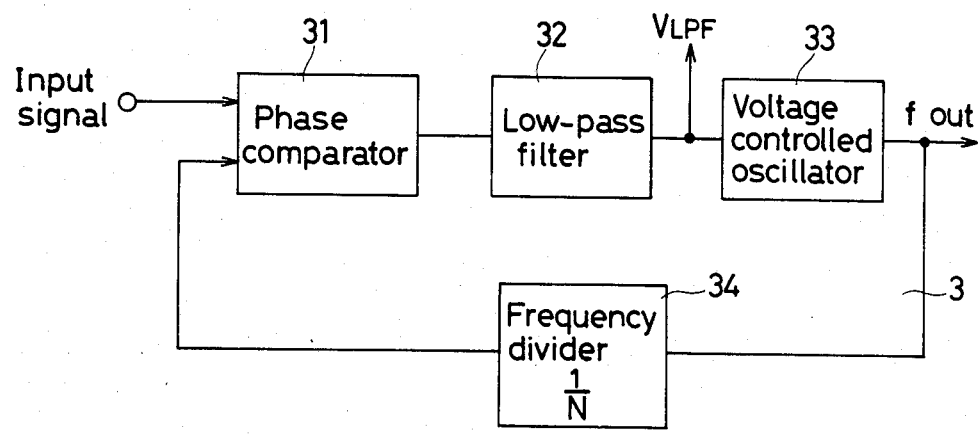
FIG. 4 shows a PLL circuit.
Figure 5:
FIGS. 5a–c show the wave forms of the voltages of several points of the PLL shown in FIG. 4.
Figure 5:
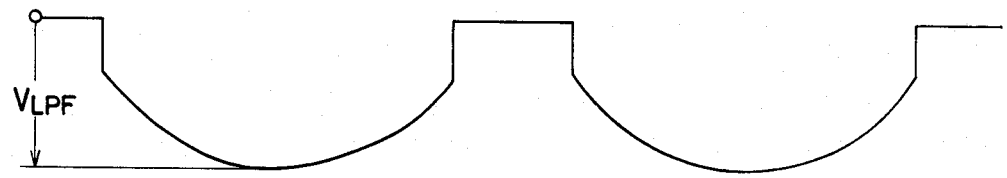
Figure 5:

FIG. 4 shows a conventional PLL (Phase Lock Loop) circit 3 for obtaining a synchronization signal requisite for controlling an image reproducing system. The PLL circuit 3 is usually composed of a phase comparator 31, a low-pass filter 32, a voltage-controlled oscillator 33 and a frequency divider 34. When the aforementioned grating signal $f_{in}$ (shown in FIG. 5(a)) is input to the PLL circuit 3, ordinarily a synchronization signal $f_{out}$ as shown in FIG. 5(c) can be obtained by multiplying the frequency of the grating signal $f_{in}$. Meanwhile, the output voltage $V_{LPF}$ of the low-pass filter 32 employed in the PLL circuit 3 corresponds to the scanning speed of the scanning beam $B_P$ as shown in FIG. 5(b), and can be expressed by an equation:

$$V_{LPF} \propto K_4 \cdot V \tag{7}$$

wherein $K_4$ is a constant.

Therefore, when a signal $\overline{V_{LPF}}$ obtained from the output signal $V_{LPF}$ of the low-pass filter 32 by adjusting the offset value and the amplitude thereof is multiplied by said integrated beam quantity E of the equation (6), a constant value free from the scanning speed V of the scanning beam can be obtained as expressed by the following equation (8).

$$\overline{V_{LPF}} \times E \stackrel{\alpha}{=} P \cdot l \cdot K_4 \text{ (constant)} \tag{8}$$

Figure 6:
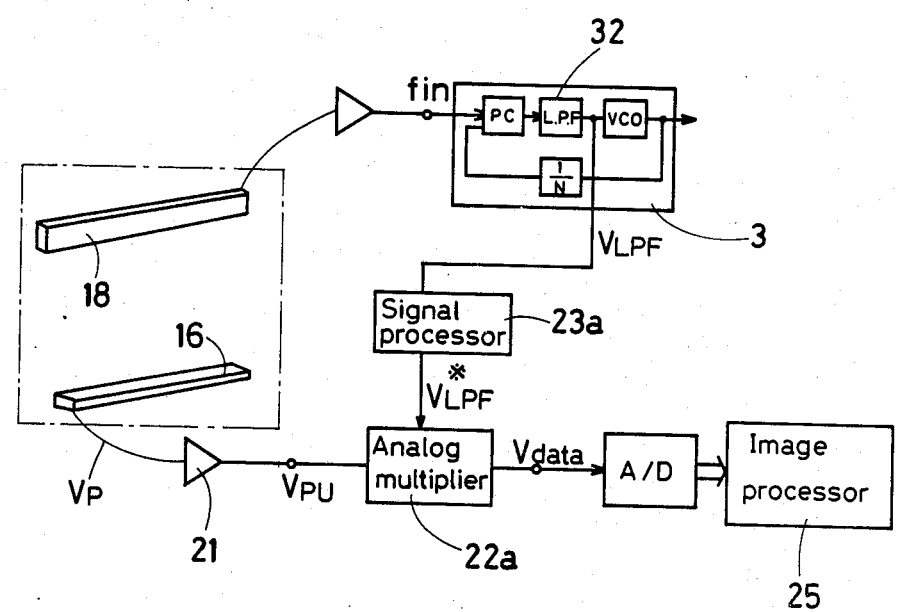
FIG. 6 shows the input scanning part of an image reproducing system to which the method of this invention is applied.
Figure 7:
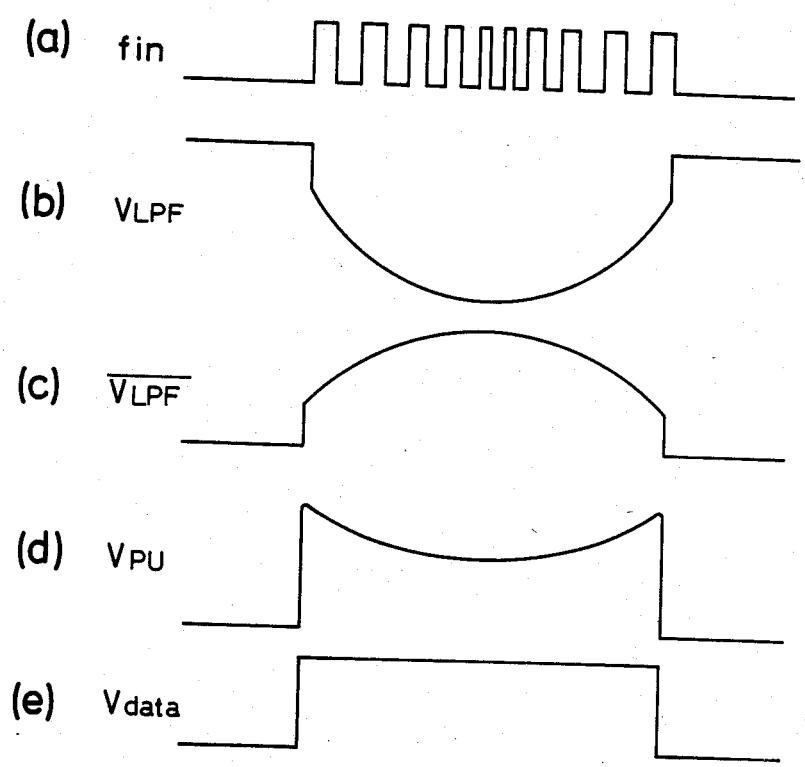
FIGS. 7a–e show the wave forms of the voltages of several points of the system shown in FIG. 6.

FIG. 6 shows the input scanning part of an image reproducing system to which the method of this invention is applied, while FIG. 7 shows the wave forms of the voltages of several points of the system shown in FIG. 6.

At first, an image signal $V_P$ obtained by scanning a reference original such as a white original is input from a photo-sensor array 16 via an amplifier 21 to one terminal of a multiplier $22_a$ as a reference signal $V_{PU}$ (shown in FIG. 7(d)). On the other hand, the output signal $V_{LPF}$ of the low-pass filter 32 as shown in FIG. 7(b) is adjusted of the offset value and amplitude thereof by a signal processor $23_a$ to be said signal $\overline{V_{LPF}}$, and then input to the other terminal of the multiplier $22_a$. The multiplier $22_a$ multiplies the value of the reference signal $V_{PU}$ by that of the signal $\overline{V_{LPF}}$ to obtain an image signal $V_{data}$ being compensated for the shading phenomenon. The image signal $V_{data}$ then undergoes A/D conversion in the A/D converter 24 to be input to an image processor 25 which carries out several operates such as a color correction operates on the image signal $V_{data}$.

Figure 8:
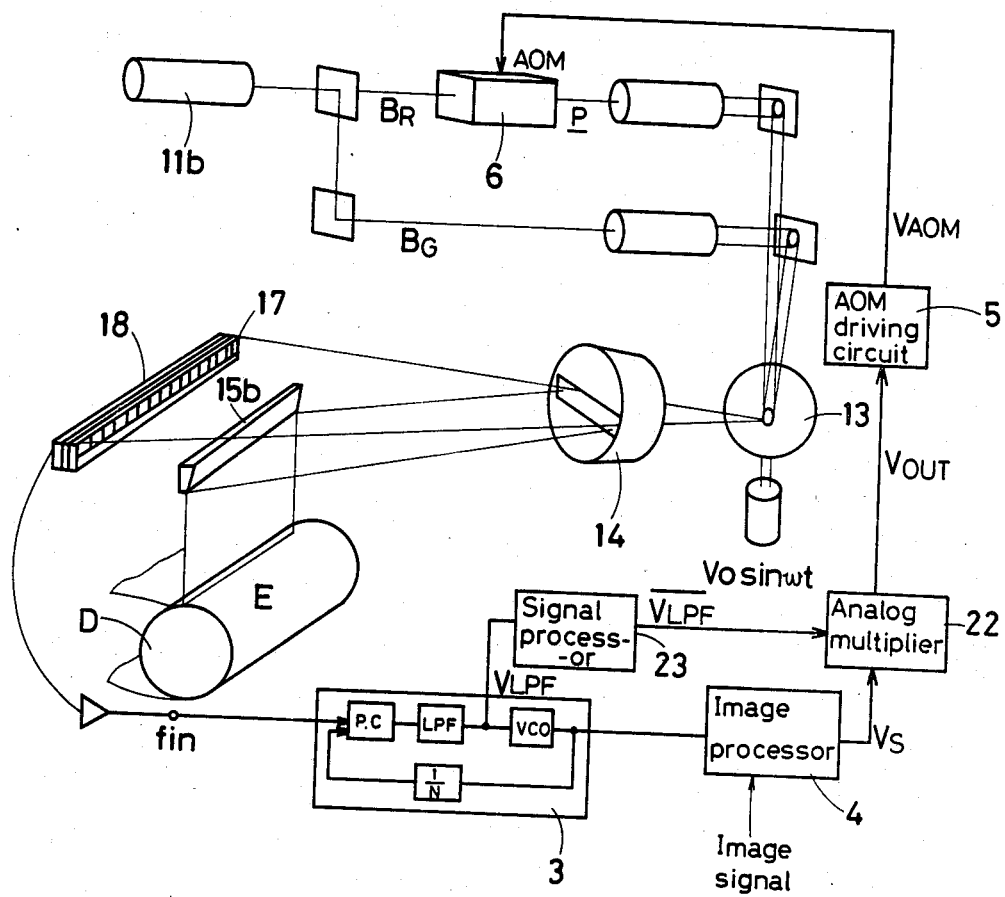
FIG. 8 shows the recording part of an image reproducing system to which the method of this invention is applied.
Figure 9:
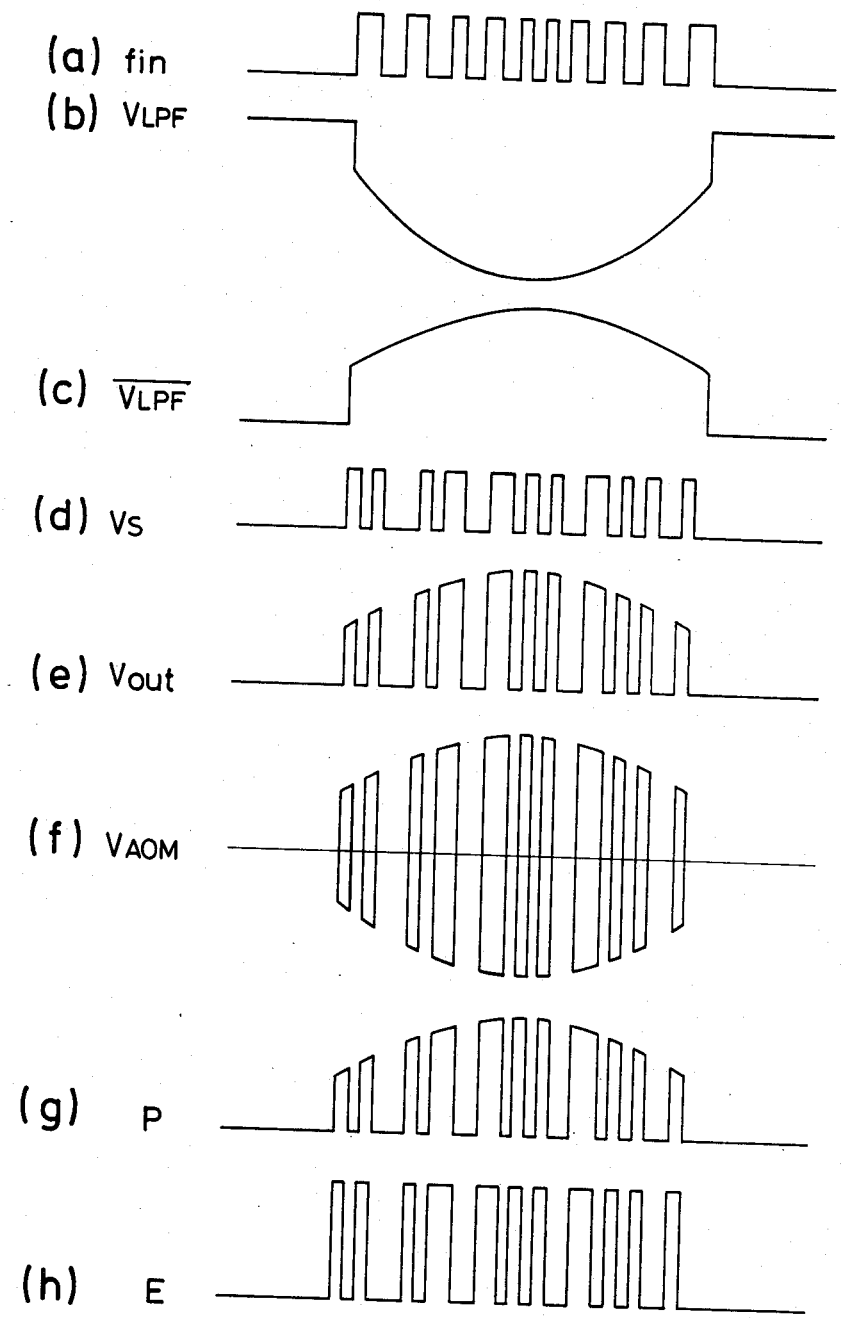
FIGS. 9a–h show the wave forms of the voltages of several points of the system shown FIG. 8.

FIG. 8 shows the recording part of an image reproducing system to which the method of this invention is applied, while FIG. 9 shows the wave forms of the voltages of several points of the system shown in FIG. 8.

Figure 1:
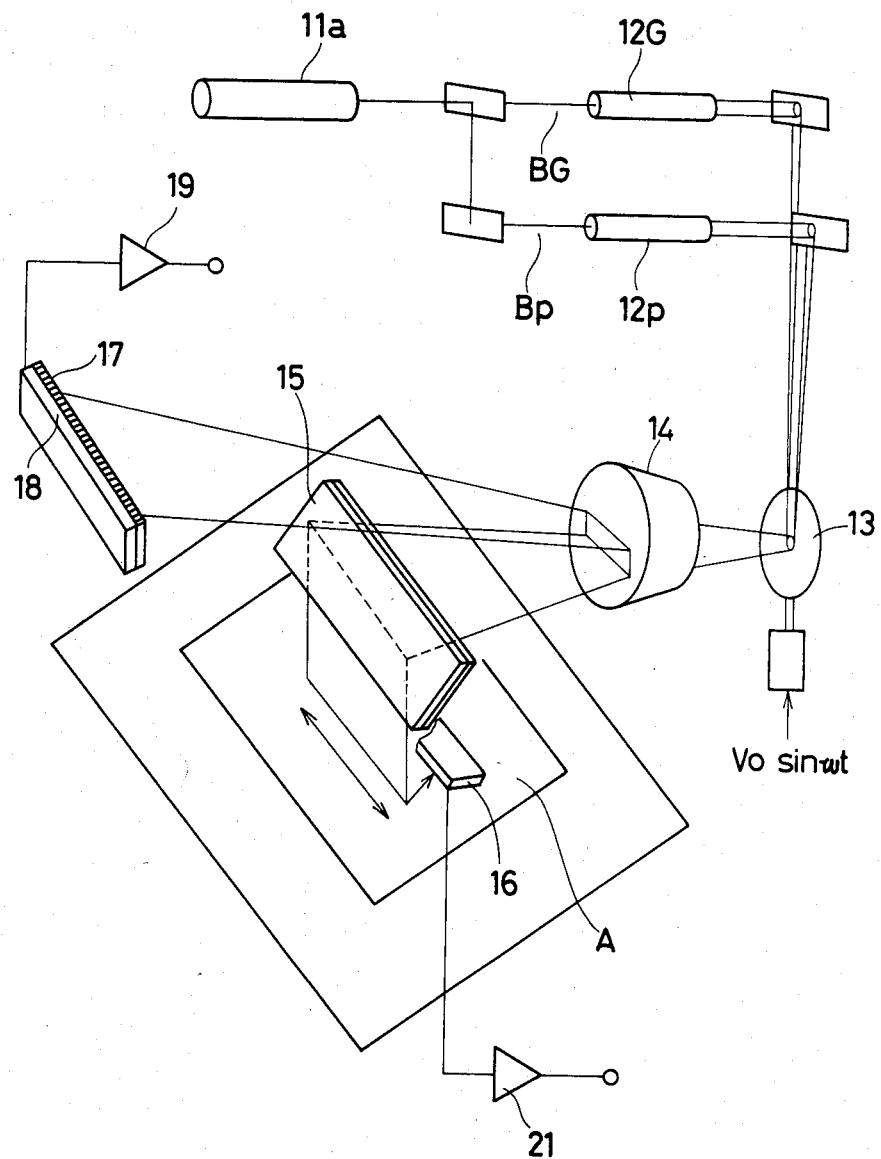
FIG. 1 shows an optical system of the input side of an image reproducing system.
Figure 2:
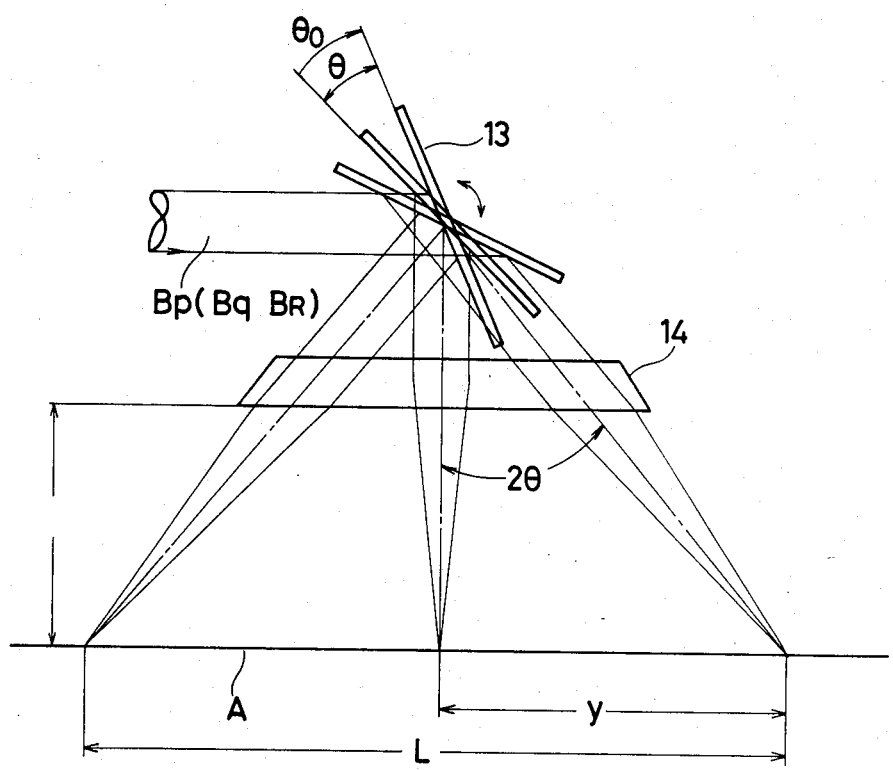
FIG. 2 shows the main part of the optical system shown in FIG. 1.
Figure 3:
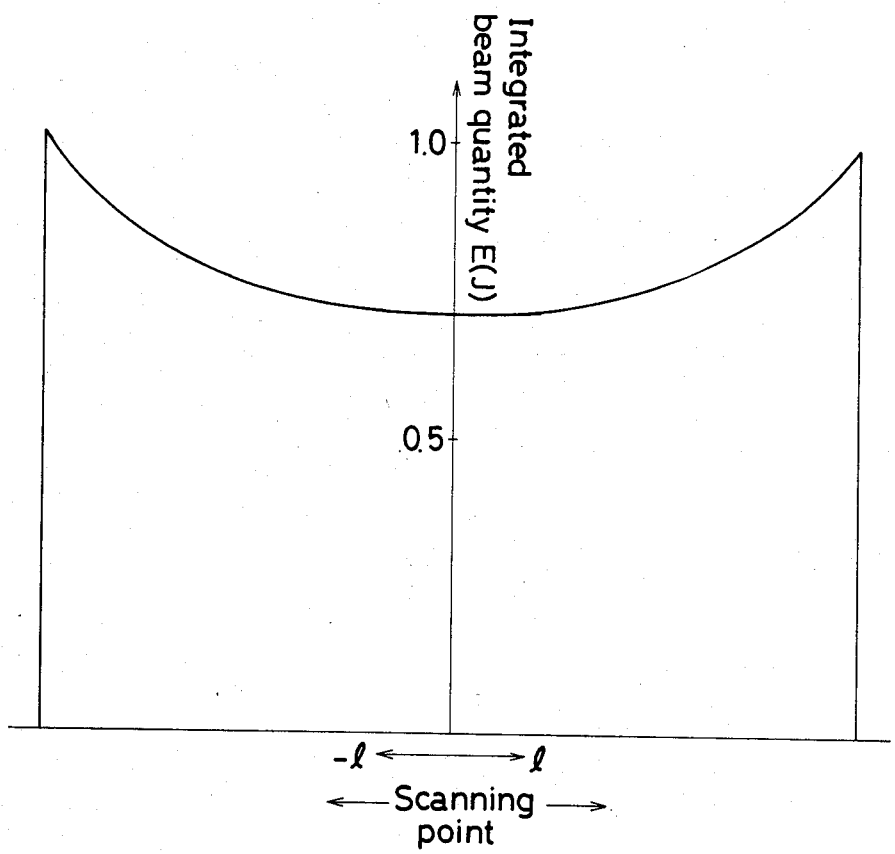
FIG. 3 shows a graph of the variation of the integrated beam quantity E of one scanning line.

The optical system of FIG. 8 comprises almost the same unit as the input system shown in FIG. 1 except for the fact that a recording beam $B_R$ is modulated by an acousto-optic modulator (AOM) 6 being driven by an AOM driving circuit 5. Precisely, a beam emitted from a beam producer $11_b$ diverges into a recording beam $B_R$ and a grating beam $B_G$. The recording beam $B_R$ is brought to a photosensitive material E mounted on a recording drum D via a galvano mirror 13, an object lens 14 and a mirror 15$_b$.

An optical system for obtaining a grating signal for the output side and a PLL circuit 3 are the same as the corresponding devices of the input side, and one set of the devices can also be common for both sides. After passing through an optical grating 17, a grating beam B$_G$ is converted into a corresponding voltage signal by the elements of a photo-sensor array 18 and is input to the PLL circuit 3. Finally, the signal $\overline{V_{LPF}}$ as shown in FIG. 9(c) is output from a signal processor 23$_b$ to an analog multiplier 22$_b$ in the same manner described on the input side.

Meanwhile the output signal of a voltage-controlled oscillator of the PLL circuit 3 is input to an image processor 4 to undergo a gradation correction process as well as to be converted to a corresponding halftone dot signal V$_S$ as shown in FIG. 9(d) and is input to the analog multiplier 22$_b$.

The halftone dot signal V$_S$ is multiplied by said signal $\overline{V_{LPF}}$ in the analog multiplier 22$_b$ to be input to the AOM driving circuit 5 as an output signal V$_{out}$ as shown in FIG. 9(e). The AOM driving circuit 5 outputs a signal V$_{AOM}$ as shown in FIG. 9(f) to the AOM 6. The AOM 6 modulates the recording beam B$_R$ obtained from a beam emitted from the beam producer 11$_b$. Consequently, by polarizing the modulated recording beam B$_R$ by the galvano mirror 13 being driven by the aforementioned signal V$_O$ (=sin ωt) in exposing a photosensitive material, a reproduction image as shown in FIG. 9(h) can be recorded.

The above-mentioned method and system can also be applied to both the input and output sides simultaneously. Besides, it can of course be applied to an independent input scanning system or to an independent recording system.

As mentioned above, materialization of this invention provides a simple and economical image reproducing system being free from a shading phenomenon without using a memory for storing compensation coefficients and a computation device because this invention adopts a simple real-time shading compensation method in which input image signal or the output recording signal is multiplied by a shading compensation signal corresponding to the variation of the scanning speed of the input scanning or the recording beam.

FIGS. 10, 11, 12, 13, 14 and 15 show another method for compensating for a shading phenomenon.

Figure 10:
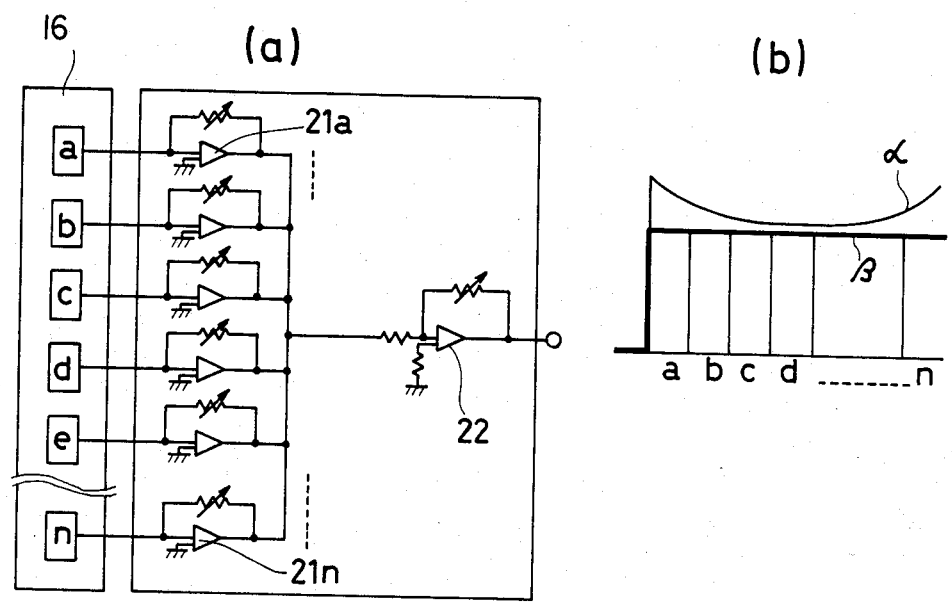
FIGS. 10a–b shows a circuit for compensating for a shading phenomenon simply and the cahracteristic thereof.

FIG. 10 shows a circuit, in which the outputs of the elements 16$_a$, 16$_b$ ... 16$_n$ of a photo-sensor array 16 are input in parallel to a differential amplifier 22 via gain-variable differential amplifiers 21$_a$, 21$_b$ ... 21$_n$ respectively.

When a curve α shown in FIG. 10(b) is the wave form of the output of each sensor element of the photo-sensor array 16 obtained by scanning a reference original such as a white original, the output signal of a constant value β as shown in FIG. 10(b) can be obtained by preponderantly reducing the gain of the differential amplifiers corresponding to the sensor elements of the edge portions.

Figure 11:
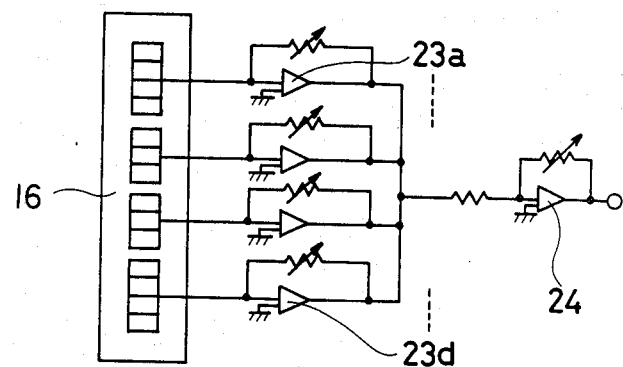
FIG. 11 shows another circuit for compensating for a shading phenomenon simply.

FIG. 11 shows another circuit, in which the outputs of several sets of consecutive plural (three or four in this case) sensor elements of the photo-sensor array 16 are input in parallel to a differential amplifier 24 via gain-variable differential amplifiers 23$_a$ to 23$_d$ respectively. After being adjusted of the amplitude by the differential amplifiers 23$_a$ to 23$_d$, the outputs of each sets of the sensor elements are output from the differential amplifier 24. Although this circuit is a simplified embodiment and is not capable of outputting a signal of a complete constant value β as shown in FIG. 10(b), practically it has no problem in compensating for the shading phenomenon.

Figure 12:
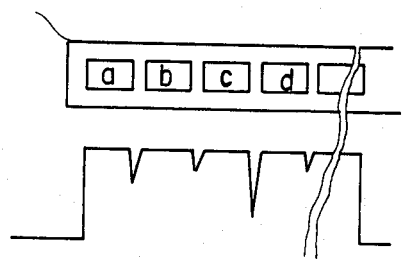
FIG. 12 shows an output signal of a photo-sensor array containing a distortion.

Thus an output signal of a constant characteristic can be obtained, from the sensor elements free from the unevenness contained in the signals caused by the variation of the scanning speed of the input scanning beam on an original. Nevertheless, the compensated signal obtained by using the circuits of FIG. 10 or 11 still contains a distortion as shown in FIG. 12. That distortion results mainly from two reasons, one of which is the deteriorated sensitivity of the edge portions of each sensor element brought about in a sensor material (wafer) cutting stage; the other is the gaps between the sensor elements. When a reproduction image is recorded by using a signal containing such a distortion, portions of the reproduction image corresponding to the distortion ingredients carry a scratch.

To resolve the above-mentioned problem, a method in which two photo-sensors 16A and 16B are employed as shown in FIG. 13(a) can be adopted. Precisely, the photo-sensors 16A and 16B are arranged symmetrically about a scanning line of an original A as shown in FIG. 13(b), while the elements of both photo-sensors are arranged alternately in the main scanning direction so as not to permit the gaps between the sensor elements of both sensors synchronize in the sub-scanning direction (shown as an arrow X) as shown in FIGS. 14(a) and (c). When a reference original (white original) is scanned by the thus arranged photo-sensors 16A and 16B, they output signals 1$_A$ and 1$_B$ as shown in FIGS. 14(b) and (d), respectively. By switching the output signals 1$_A$ and 1$_B$ with a multiplexer 19 controlled by a changeover clock S (shown in FIG. 14(e)) output from a changeover signal generator 20 (shown in FIG. 13(a)), a final output image signal V$_{in}$ can be obtained, containing none of the above described type of distortion ingredients as shown in FIG. 14(f).

Figure 15:
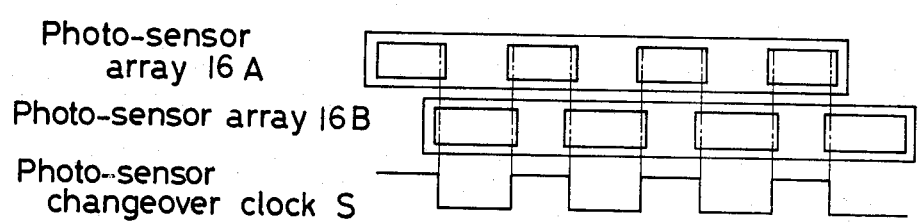
FIG. 15 shows a relation between two photo-sensors.

In the above method in which the output signal is obtained alternately from the two photo-sensors, each gap between the sensor elements of the photo-sensors 16A and 16B can be widened to the width corresponding to the length of a linear characteristic portion of the sensor element as shown in FIG. 15, therefore, each of the photo-sensors 16A and 16B can be composed of a smaller number of sensor elements in comparison with the photo-sensor used in the circuit of FIG. 10.

Figure 13:
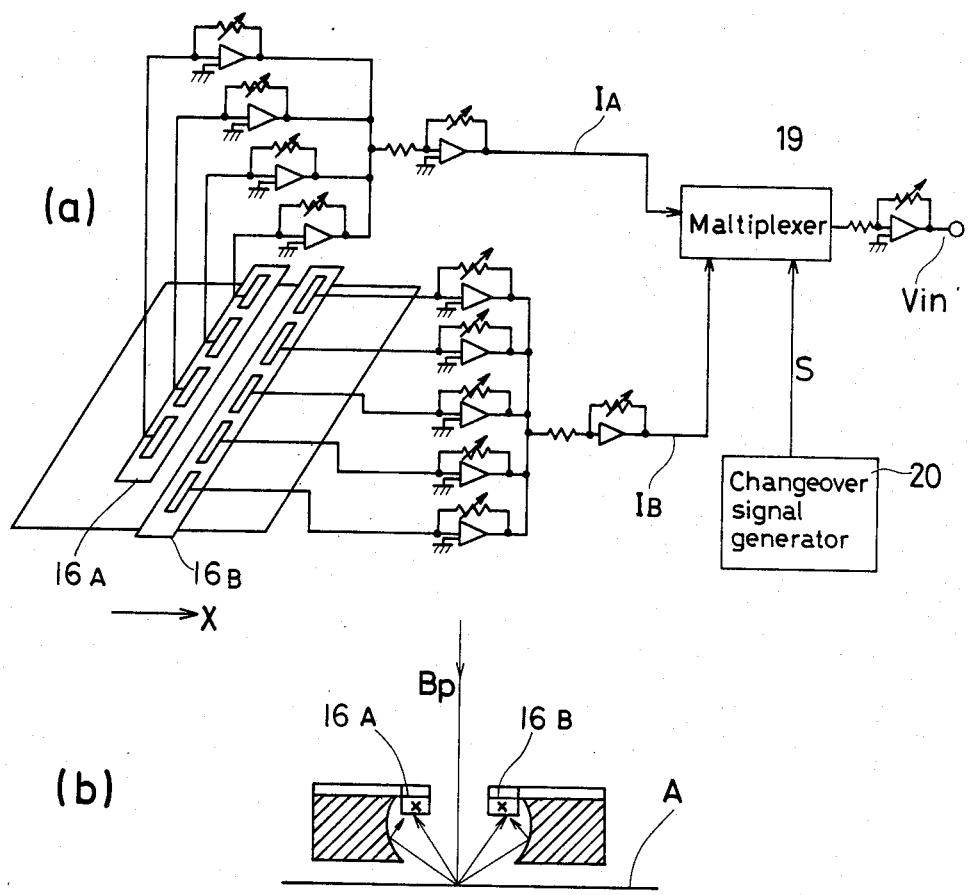
FIGS. 13a–b show another circuit for compensating for a shading phenomenon and the section shape of the photo-sensor thereof.
Figure 14:
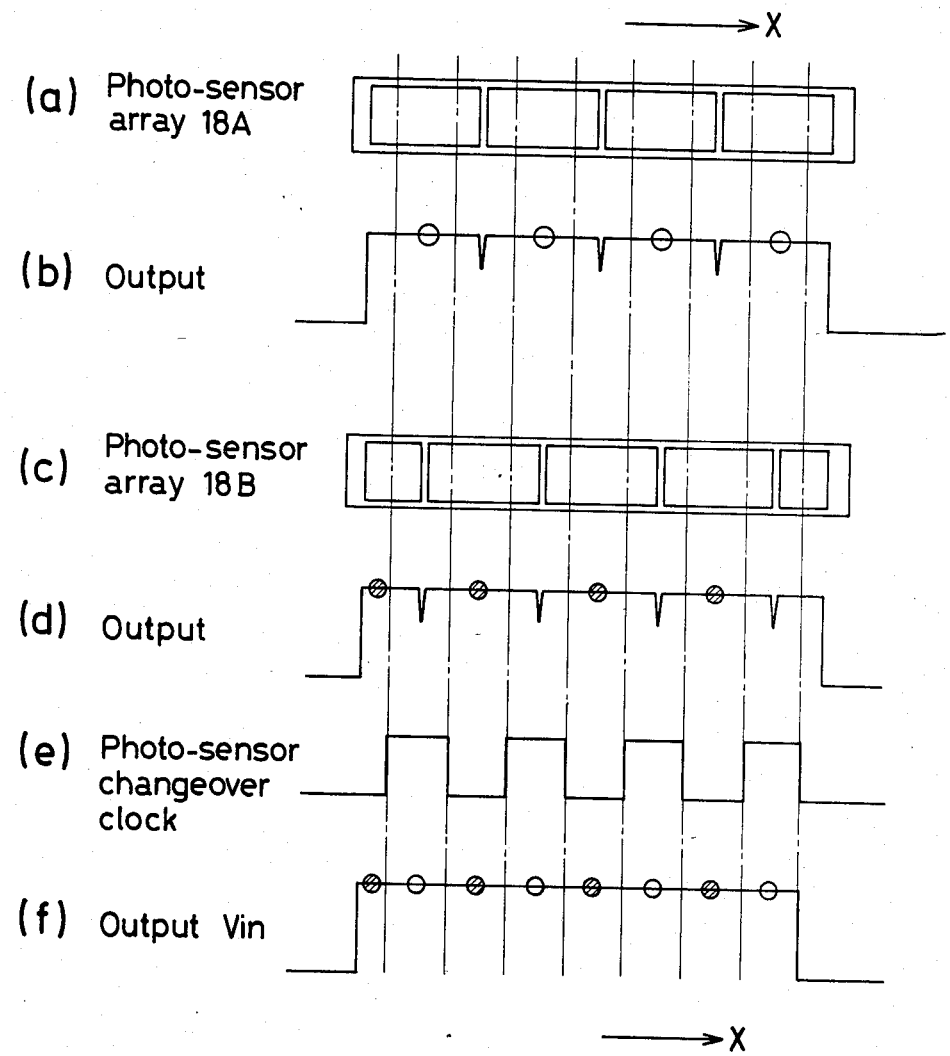
FIGS. 14a–f show several signals in correspondence with photo-sensors.

Although in the circuits of FIGS. 13 and 14, one differential amplifier is provided for one sensor element, it should be noted that, one differential amplifier can also be shared by a plurality of sensor elements.

The above-mentioned three methods are capable of automatically compensating for a shading phenomenon by previously determining the gain of each differential amplifier without using any memory for memorizing compensation coefficients and without requiring any computation device for processing image data using the coefficients.

We claim:

1. A method for campensating for a shading phenomenon comprising the steps of:
    (a) obtaining a shading compensation signal by processing an output signal of a low-pass filter employed in a phase lock loop circuit for outputting signals in synchronism with a scanning speed of an input scanning beam polarized by a beam polarizing means; and (b) multiplying the shading compensation signal obtained in the step (a) by an image signal obtained by scanning an original with an input scanning beam polarized by the beam polarizing means.

2. A method claimed in claim 1, in which the shading compensation signal is obtained by controlling a offset value and a amplitude produced by the output signal of the low-pass filter.

3. A method for compensating for a shading phenomenon comprising the steps of:

(a) obtaining a shading compensation signal by processing a output signal of a low-pass filter employed in a phase lock loop for outputting signals in synchronism with a recording speed of a recording beam for exposing a photosensitive material polarized by a beam polarizing means; and (b) multiplying the shading compensation signal obtained in the step (a) of this claim by a recording signal obtained by carrying out necessary processes on an input image signal.

4. A method claimed in claim 3, in which the shading compensation signal is obtained by controlling a offset value and a amplitude produced by the output signal of the low-pass filter.

5. A system for compensating for a shading phenomenon comprising:

(a) a signal processing means for processing a output signal of a low-pass filter employed in a phase lock loop and for outputting signals in synchronism with a scanning speed of an input scanning beam polarized by a beam polarizing means to obtain a shading compensation signal; and (b) a multiplication means for multiplying the shading compensation signal obtained in the step (a) of this claim by an image signal obtained by scanning an original with an input scanning beam polarized by the beam polarizing means.

6. A system claimed in claim 5, in which the signal processing means is operable for processing the output signal of the low-pass filter of the phase lock loop by varying an offset value and an amplitude thereof.

7. A system as recited in claim 5 wherein said signal processing means includes synchronizing means for outputting said signals in synchronism with the scanning speed of the input scanning beam.

8. A system as recited in claim 7 wherein said processing means includes amplitude control means for varying an offset value of the output signal of the low-pass filter and for varying an amplitude thereof.

9. A system for compensating for a shading phenomenon comprising:

(a) a signal processing means for processing an output signal of a low-pass filter employed in a phase lock loop and for outputting signals in synchronism with a recording speed of a recording beam for exposing a photosensitive material polarized by a beam polarizing means to obtain a shading compensation signal; and (b) A multiplying means for multiplying the shading compensation signal obtained in the step (a) of this claim by a recording signal obtained by carrying out necessary processes on an input image signal.

10. A system claimed in claim 9, in which the signal processing means is operable for processing the output signal of the low-pass filter of the phase lock lop by varying an offset value and an amplitude thereof.

11. A system as recited in claim 9 wherein said signal processing means includes synchronizing means for outputting said signals in synchronism with a recording speed of a recording beam.

12. A system as recited in claim 11 wherein said processing means includes amplitude control means for varying an offset value of the output signal of the low-pass filter and for varying an amplitude thereof.

* * * * *